Sept. 21, 1965   BO GÖSTA FORSSTRÖM ETAL   3,207,398
DEVICE FOR CUTTING A GLASS PLATE SO AS TO PRODUCE A SHARP EDGE
Filed Aug. 14, 1963                                3 Sheets-Sheet 1

INVENTORS
Bo Gösta Forsström
Karl Göran Algy Persson
By Pierre Schiffler & Parker
Attorneys INVENTORS
Bo Gösta Forsström
Karl Göran Algy Persson

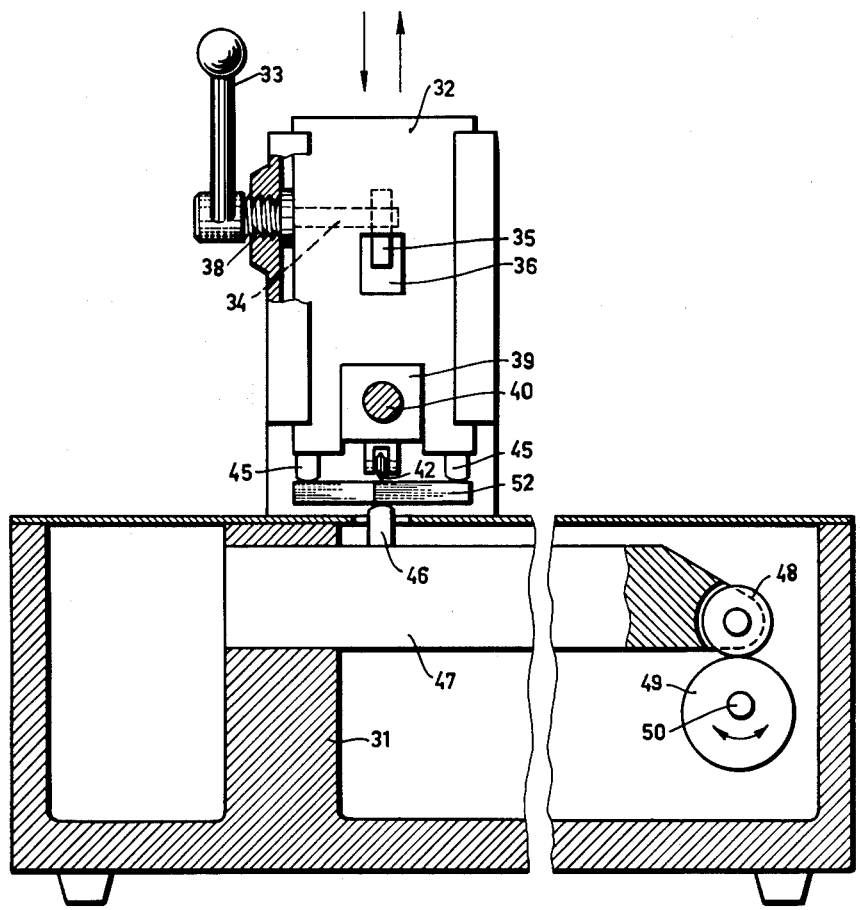

United States Patent Office 3,207,398
Patented Sept. 21, 1965

3,207,398
DEVICE FOR CUTTING A GLASS PLATE SO AS TO PRODUCE A SHARP EDGE
Bo Gösta Forsström, Mariehall, and Karl Göran Algy Persson, Stockholm, Sweden, assignors to LKB-Produkter Aktiebolag, a company of Sweden
Filed Aug. 14, 1963, Ser. No. 302,098
Claims priority, application Sweden, Aug. 31, 1962, 9,462/62
6 Claims. (Cl. 225—96)

This invention relates to a device for cutting a glass plate so as to produce a sharp edge. The main object of the invention is to produce glass knives for microtomes. Earlier, one has made such glass knives by applying a scratch to the surface of a glass plate, said scratch making the desired angle to one of the edges of the glass plate, and thereafter breaking the glass plate along the scratch in a manual operation. The invention has proved that a much better edge is produced if said scratching and breaking operations are made under controlled conditions, as will be explained hereinbelow.

The device according to the invention comprises fastening means for securing the glass plate in a fixed position, means for applying a scratch to one surface of the glass plate while being secured in said fixed position, and means for breaking the glass plate along said scratch while still being secured in said fixed position.

Figure 1:
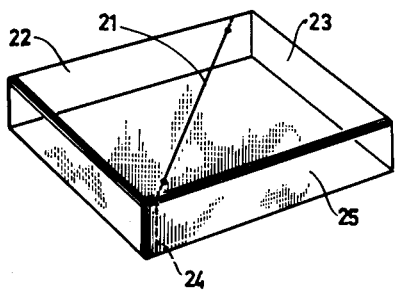
Figure 2:
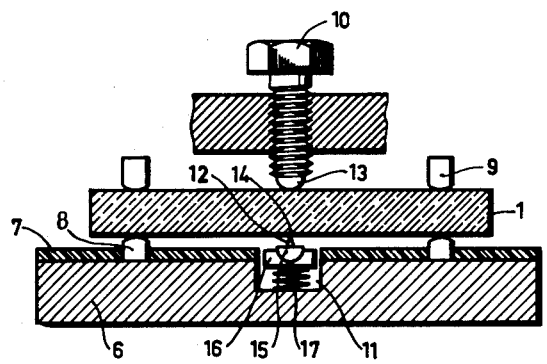
Figure 3:
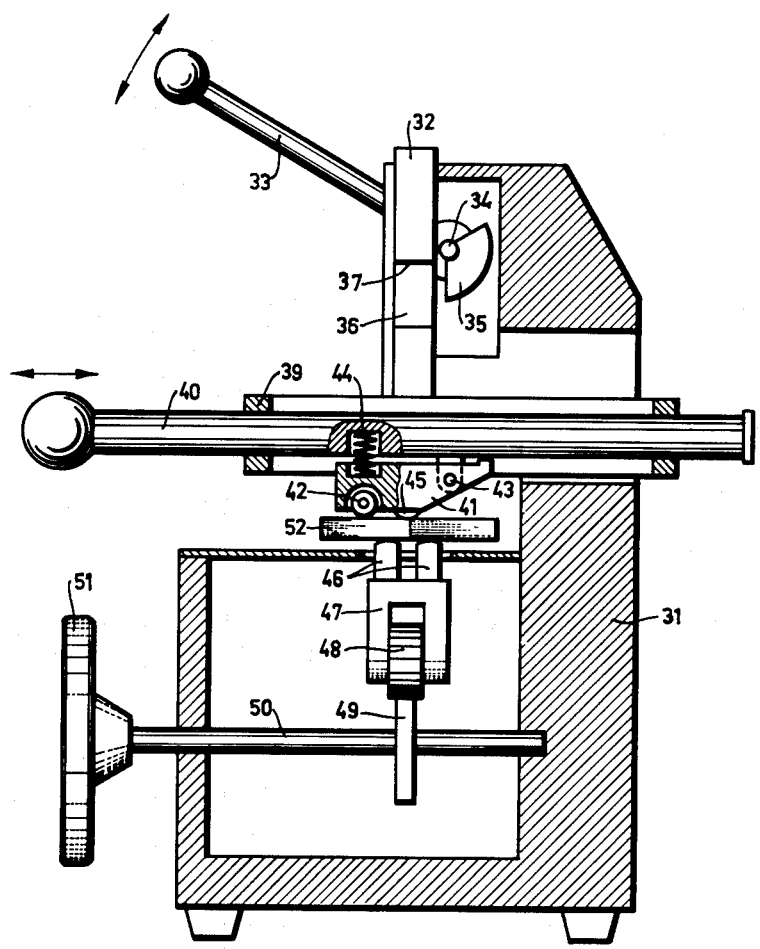

The invention will be described hereinbelow with reference to the accompanying drawings. FIG. 1 shows a square glass plate which shall be cut up so as to form two knives for a microtome. FIG. 2 shows a section through an apparatus according to the invention. FIGS. 3 and 4 show two vertical sections through another apparatus according to the invention.

The square glass plate illustrated in FIG. 1 has on its upper surface a scratch 21 extending substantially (but not exactly) diagonally between two opposite corners of the plate. It has been found useful that the ends of the scratch 21 are situated 1–2 millimeters from the edges of the glass plate. When the glass plate is broken along the scratch 21, the rupture extends as illustrated by the dotted lines. The plate is broken into two triangular pieces 22 and 23. The piece 23 will have a sharp edge along the dotted line 24. The piece 22 will have a sharp edge along the corresponding line of rupture at the opposite corner of the glass plate. If using a homogeneous glass and breaking the plate under controlled conditions the sharp edge 24 will extend perpendicularly to the edge 25 of the plate.

It is desired that the forces which are active in breaking the glass plate engage the plate in a perfect symmetry relative to the scratch. FIG. 2 shows an apparatus operating with such a perfect symmetry.

A square glass plate 1 is placed upon a base 6 having a comparatively soft surface layer 7, for instance of plastic, preferably Teflon. The glass plate is supported by two rounded supports 8 projecting somewhat above the surface of the base. For the sake of clarity the space between the glass plate and the base is shown too broad. The base 6 has a groove 11 which contains a scratching point 12 which can be moved along the groove by an actuating rod 15 which is slidably supported by a guide member 16. A spring 17 engages the bottom of the guide member and presses the scratching point against the lower surface of the glass plate with a force sufficient for producing the scratch 14. The scratching point 12 is arranged to move in a path which extends at right angles to a line connecting the two supports 8 and through the centre point of said line. In this way, the two supports 8 will be situated absolutely symmetrical relative to the scratch 14. The glass plate is held in a fixed position during the scratching and the subsequent breaking operation by a holder consisting of two other supports in the form of rounded knobs 9 pressing against the upper surface of the plate. Said two knobs 9 register with the two supports 8, i.e. they engage the glass plate exactly opposite the supports. Consequently, the knobs 9 do not produce any stresses in the glass plate.

Above the glass plate is a screw 10 having a rounded point 13. The screw is situated exactly between the two knobs 9. Consequently, the screw attacks the glass plate with a breaking force in the vertical plane defined by the scratch 14. When the screw is screwed downward the glass plate is bent toward the base until the glass plate ruptures along the scratch 14, which shall preferably take place when or just before the lower surface of the glass plate touches the base. If the glass plate is in contact with the comparatively soft surface layer 7 in the moment of rupture, said surface layer will reduce or eliminate such vibrations as would otherwise occur in the glass plate in the moment of rupture. Such vibrations would cause the rupture to be transmitted through the glass plate in an irregular and uncontrollable way, thereby producing an uneven surface of rupture and an edge of low quality.

The desired thickness of the space between the glass plate and the base can be found by experiments while taking into consideration the dimensions of the glass plate, the quality of the glass, etc. When cutting a glass plate having a side length of about 25 mm. and a thickness of 5 mm., the distance between the supports 8 being 20 mm., it was found that the supports should preferably project 0.03 mm. above the surface of the base. The best result was obtained when the screw 10 was screwed down at a velocity of about 0.1 mm. per second.

The vibrations mentioned above are due to the fact that the apparatus is not sufficiently rigid. FIGS. 3 and 4 illustrate an apparatus being sufficiently rigid for avoiding such vibrations, resulting in a satisfactory operation without the necessity of using a base with a soft surface as illustrated in FIG. 2.

The apparatus of FIGS. 3 and 4 comprises a base 31 supporting a slide 32 which can be moved up and down. The slide is operated by a lever 33 which can be turned on a horizontal shaft 34 mounted in the base. A lifting member 35 being shaped as a sector of a circle is secured to shaft 34. When the lever 33 is in the position shown in FIGS. 3 and 4 the slide is free to move up and down. When lever 33 is lifted member 35 moves into an opening 36 in slide 32 and engages the upper wall 37 of said opening, thus lifting slide 32. When lever 33 is lowered from the illustrated position a threaded portion 38 of shaft 34 is screwed so as to engage slide 32, thus locking it.

The bottom of the slide 32 is provided with two knobs 45. The slide also supports means for scratching the surface of a glass plate. Said scratching means comprises a holder 41 pivoted on a horizontal shaft 43 supported by a rod 40 which can be moved in its lengthwise direction in bearings 39. Holder 41 supports a sharp-edged steel roller 42 having a hardness sufficient for producing a scratch or superficial groove in a glass plate 52. The holder with the scratching roller is pressed against the glass plate by a coil spring 44. The scratching roller 42 is situated exactly in the centre between the two knobs 45.

The base 31 further supports a beam or rod 47. One end of the rod is firmly fixed to the base. The free end of said rod 47 is provided with a wheel 48 engaging an eccentric wheel 49 mounted on a shaft 50 which supports an operating handle 51. The rod 47 supports two knobs 46 situated exactly in the vertical plane defined by the scratching roller 42. The knobs 46 are situated close to the fixed end of rod 47. Consequently, a movement of the free end of rod 47 produces a considerably smaller movement of knobs 46.

For operation, slide 32 is lifted and a glass plate is placed on the knobs 46. The slide is lowered so that the knobs 45 come into contact with the glass plate. The slide is now locked by means of lever 33. The glass plate now carries the weight of the slide.

A scratch is now produced on the upper surface of the glass plate by means of the scratching roller 42, for instance a scratch having the appearance illustrated in FIG. 1. Thereafter, the operator turns operating handle 51, thereby lifting the free end of rod 47. As a result of this, knobs 46 will also be lifted a distance which is very short but which is sufficient for breaking the glass plate along the scratch. Owing to the fact that the base of the apparatus has a high rigidity, and that the means for moving the knobs 46 also have a high rigidity, the rupture will be transmitted through the glass plate at a controlled, comparatively low velocity, resulting in sharp glass edges of a high quality.

What is claimed is:

1. A device for cutting a glass plate so as to produce a sharp edge comprising a base, a slide supported by said base, means for moving the slide up and down and for locking it in any desired position, two first support elements carried by the slide so as to engage the upper side of a glass plate, scratching means supported by the slide and arranged to produce a scratch on the upper side of the glass plate, said scratch extending perpendicularly to a line connecting said support elements and through the centre point of said line, two other support elements arranged to engage the lower side of the glass plate in the vertical plane defined by said scratch, and operating means for pressing said two other support elements against the glass plate so as to break the glass plate along the scratch.

2. A device as claimed in claim 1, in which said scratching means comprises a rod movable in its lengthwise direction, a holder pivoted on said rod, a scratching roller mounted on said holder, and a spring arranged to actuate the holder so as to press the scratching roller against the glass plate.

3. A device as claimed in claim 1, in which said operating means comprises a rod having one free end and one end firmly fixed to the base, said two second knobs being secured to the rod near its fixed end, and means for actuating the free end of the rod so as to bend the rod.

4. A device as claimed in claim 3, in which the means for actuating the free end of the rod comprises an eccentric wheel.

5. In a device for breaking a glass plate along a scratch line made along one broad face of the plate so as to produce a sharp edge on the plate, the combination comprising a pair of members arranged to press against the broad face of the glass plate which includes the scratch line to establish two pressure points lying on opposite sides of and at equal distances from said scratch line, a third counter-pressing member arranged to press against the opposite broad face of said glass plate to establish a counter-pressure point in alignment with said scratch line, and a base member having a plane relatively soft surface adapted to engage one broad face of the glass plate at the moment the plate is ruptured along the scratch line by the pressures applied in opposite directions by said pressing members, said soft surface of said base plate serving to cushion and minimize vibrations such as would otherwise be produced in said glass plate at the moment of rupture.

6. A device for breaking a glass plate as defined in claim 5 wherein said soft surface of said base plate is engageable with that face of said glass plate which includes said scratch line.

References Cited by the Examiner

UNITED STATES PATENTS

| 1,117,736 | 11/14 | Whittemore | 225—96.5 |
| 1,946,356 | 2/34 | Owen | 225—96.5 |
| 2,924,044 | 2/60 | Basso | 225—103 |

ANDREW R. JUHASZ, *Primary Examiner.*

WILLIAM W. DWYER, JR., *Examiner.*